United States Patent [19]

Cohen et al.

[11] 4,117,386
[45] Sep. 26, 1978

[54] DIGITAL CONTINUOUS POTENTIOMETER SERVO FEEDBACK ELEMENT

[75] Inventors: Richard L. Cohen, Matawan; Richard J. Anderson, Fairfield, both of N.J.

[73] Assignee: The Bendix Corporation, Teterboro, N.J.

[21] Appl. No.: 817,637

[22] Filed: Jul. 21, 1977

[51] Int. Cl.² .................................................. G05B 1/06
[52] U.S. Cl. ..................................... 318/664; 318/665
[58] Field of Search ................................ 318/664, 665

[56] References Cited
U.S. PATENT DOCUMENTS

| | | | |
|---|---|---|---|
| 3,155,889 | 11/1964 | Stiles et al. | 318/664 X |
| 3,662,246 | 5/1972 | Cohen et al. | 318/663 |
| 3,731,171 | 5/1973 | Holley, Jr. | 318/664 X |
| 3,826,964 | 7/1974 | Byrne | 318/664 X |

*Primary Examiner*—B. Dobeck
*Attorney, Agent, or Firm*—Anthony F. Cuoco

[57] ABSTRACT

A servo system feedback element including a potentiometer for providing a follow-up output having a waveform wherein the follow-up output increases linearly to a maximum value and decreases linearly to zero resulting in smooth operation of the servo for the full 360° displacement of the potentiometer arm. Circuitry is provided to insure that the feedback element follows the shortest path to its command position.

7 Claims, 2 Drawing Figures

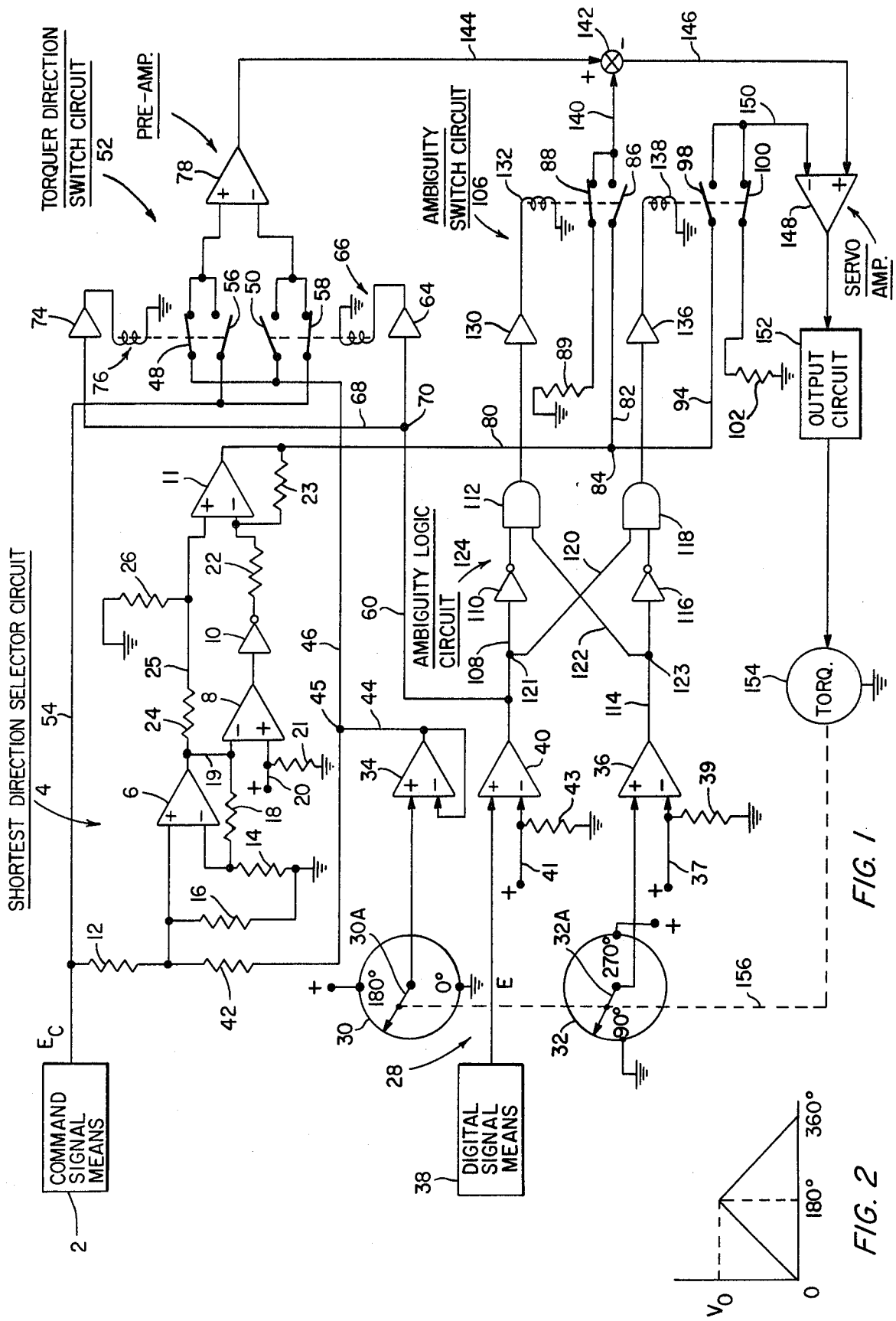

DIGITAL CONTINUOUS POTENTIOMETER SERVO FEEDBACK ELEMENT

CROSS REFERENCE TO RELATED PATENTS

This invention is an improvement over the Digital Continuous Potentiometer Servo Feedback Element described and claimed in U.S. Pat. No. 3,662,246 issued on May 9, 1972 to Richard L. Cohen, Harold Moreines and Walter Parfomak and assigned to The Bendix Corporation, assignee of the present invention.

BACKGROUND OF THE INVENTION

1. Field of the Invention

This invention relates generally to feedback elements for servo systems, and particularly to potentiometer type feedback elements. More particularly, this invention relates to a digital continuous potentiometer servo feedback element for providing smooth operation of the servo for the full displacement of the potentiometer arm.

2. Description of the Prior Art

Servo systems used in aircraft instrumentation are of the digital continuous closed loop type including a feedback element in the servo loop. Since synchros have the characteristic of 360° angular displacement and provide a continuous output without deadband, prior to the invention of U.S. Pat. No. 3,662,246 they had been commonly used as the feedback element. This was because conventional potentiometers have limited angular displacement (about 350°) and hence are not suitable for the purposes described.

The potentiometer of U.S. Pat. No. 3,662,246 overcomes this difficulty and provides several additional advantages. Included among these are that simple digital to analog converters rather than more complicated digital to synchro converters may be used in the system and descrete most significant (MSB) inputs from digital signals may be applied. Further, an all d.c. feedback loop is thus provided.

While this type of potentiometer feedback element performs reasonably well for the purposes intended, one significant problem remains. Consider that the potentiometer servo feedback element of U.S. Pat. No. 3,662,246 has its excitation switched through a rotary switch every 180° to generate two output ramps per revolution of the potentiometer arm. However, the potentiometer excitation switch point, which is determined by the rotary switch, cannot always be accurately aligned to the potentiometer terminations. This causes instrument display errors. In addition, during slew conditions the instantaneous error into the servo changes abruptly at the switch point. Thus, the servo changes speed every time it switches, i.e., at the 0° and 180° points. The device of the present invention is an improvement over the prior art potentiometer feedback element described in U.S. Pat. No. 3,662,246 in that a constant excitation is provided which eliminates the aforenoted switching and the errors associated therewith.

SUMMARY OF THE INVENTION

This invention contemplates a digital continuous potentiometer servo feedback element wherein the potentiometer excitation is constant resulting in smooth servo operation for the full 360° displacement of the potentiometer arm. The arrangement is such that when the potentiometer arm is displaced the potentiometer output to ground increases linearly from zero voltage at 0° displacement to maximum voltage at 180° displacement, after which it decreases linearly to zero voltage at 360° displacement for providing the aforenoted smooth servo operation. Thus, the servo operates in a first zone (0° to 180°) and in a second zone (180° to 360°). Circuitry is provided to determine when the servo command and follow-up signals are not in the same zone and to determine the shortest displacement of the potentiometer arm to bring said signals into the same zone.

The main object of this invention is to provide a digital continuous potentiometer servo feedback element which permits smooth servo operation for the full 360° displacement of the potentiometer arm.

Another object of this invention is to provide a potentiometer feedback element of the type described which enables simple digital to analog converters to be used and descrete most significant bit inputs from digital signals to be applied.

Another object of this invention is to provide an all d.c. servo feedback loop.

Another object of this invention is to provide a device of the type described which provides constant potentiometer excitation to eliminate potentiometer excitation switching and to provide a more accurate device than has heretofore been available.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is an electrical schematic diagram of a servo system including a potentiometer feedback element according to the invention.

FIG. 2 is a graphical representation of the potentiometer output signal provided according to the invention.

DESCRIPTION OF THE INVENTION

With reference to FIG. 1, a d.c. command signal $E_c$ provided by a command signal means 2 is applied to a shortest direction selector circuit designated generally by the numeral 4. Circuit 4 includes and input amplifier 6 having a non-inverting input terminal (+) and an inverting input terminal (−), an amplifier 8 having an inverting input terminal (−) and a non-inverting input terminal (+), an inverting amplifier 10 and an output amplifier 11 having an inverting input terminal (−) and a non-inverting input terminal (+).

Signal $E_c$ is applied through a resistor 12 to the non-inverting input terminal (+) of amplifier 6. The inverting input terminal (−) of amplifier 6 is grounded through a resistor 14. A resistor 16 is connected intermediate resistor 12 and the non-inverting input terminal (+) of amplifier 6 and is connected intermediate resistor 14 and ground.

A resistor 18 is connected intermediate grounded resistor 14 and inverting input terminal (−) of amplifier 8. Resistor 18 is connected to the output terminal of amplifier 6 through a conductor 19. The non-inverting input terminal (+) of amplifier 8 receives a suitable positive d.c. signal through a conductor 20. Conductor 20 is connected to ground through a resistor 21.

The output of amplifier 8 is connected to inverting amplifier 10, and therefrom through a resistor 22 to the inverting input terminal (−) of output amplifier 11. The output of amplifier 6 is connected through a resistor 24 and a conductor 25 to the non-inverting input terminal (+) of amplifier 11. Conductor 25 is connected to ground through a resistor 26. The output terminal of amplifier 11 is connected to the inverting input terminal (−) of amplifier 11 through a resistor 23.

Potentiometer feedback means designated by the numeral 28 includes a potentiometer 30 and a potentiometer 32 in ganged relation. Potentiometer 30 receives a suitable positive d.c. signal at its 180° tap and is grounded at its 0° tap, while potentiometer 32 receives a suitable positive d.c. signal at its 270° tap and is grounded at its 90° tap. Thus, it will be seen that potentiometer 32 is offset from potentiometer 30 by 90° for purposes which will be hereinafter explained.

An arm 30A of potentiometer 30 is connected to the non-inverting input terminal (+) of an isolation amplifier 34, while and arm 32A of potentiometer 32 is connected to the non-inverting input terminal (+) of an isolation amplifier 36. The inverting input terminal (−) of amplifier 36 receives a suitable positive d.c. signal through a conductor 37. Conductor 37 is connected to ground through a resistor 39.

A digital signal means 38 provides a digital signal $E_M$ corresponding to the most significant bit (MSB) of a digital servo system output signal. Signal $E_M$ is applied to the non-inverting input terminal (+) of a logic amplifier 40, while the inverting input terminal (−) of logic amplifier 40 receives a suitable positive d.c. signal through a conductor 41. Conductor 41 is connected to ground through a resistor 43.

The output of isolation amplifier 34 is applied to the inverting input terminal (−) thereof, and is applied through a conductor 44, joining at a point 45 a conductor 46 leading from resistor 42, to the non-inverting input terminal (+) of amplifier 6 in circuit 4. Conductor 46 is connected to a normally closed switch 48 and to a normally open switch 50 in a torquer direction switch circuit designated generally by the numeral 52. Command signal $E_c$ from command signal means 2 is applied through a conductor 54 to a normally open switch 56 and to a normally closed switch 58 in torquer direction switch circuit 52.

The output from logic amplifier 40, which is either a logic "high" or a logic "low" depending on the level of signal $E_M$, is applied through a conductor 60 to a driving amplifier 64 which drives a relay 66 for actuating switches 50 and 58. The output from amplifier 40 is applied through conductor 60 and through a conductor 68 connected to conductor 60 at a point 70 to a driving amplifier 74 which drives a relay 76 for actuating switches 48 and 56. In this connection it is noted that while relays 66 and 76 are shown for purposes of illustration as actuating mechanical switches, the relays and switches may be replaced by solid state switches, such as field effect transistors, as will now be understood by those skilled in the art.

Thus, torquer direction switch circuit 52 provides switching means for reversing the connections to a preamplifier 78. The output provided by either of the switches 48 and 56 being closed is applied to the non-inverting input terminal (+) of preamplifier 78, while the output provided by either of the switches 50 and 58 being closed is applied to the inverting input terminal (−) of preamplifier 78.

The output from output amplifier 11 in shortest direction selector circuit 4 is applied through a conductor 80 and a conductor 82 connected thereto at a point 84 to a normally open switch 86. A normally closed switch 88 is connected to ground through a resistor 89. The output from amplifier 11 is applied through conductor 80 and a conductor 94 connected to conductor 80 at point 84 to a normally open switch 98. A normally closed switch 100 is connected to ground through a resistor 102. Switches 86, 88, 98 and 100 are included in an ambiguity switch circuit designated generally by the numeral 106.

The output of logic amplifier 40 is applied through a conductor 108 to an inverting amplifier 110, and the output of inverting amplifier 110 is connected to one input of an NAND gate 112. The output of isolation amplifier 36 is applied through a conductor 114 to an inverting amplifier 116, and the output of inverting amplifier 116 is connected to one input of an NAND gate 118. The output of amplifier 40 is applied through a conductor 120 connected to conductor 108 at a point 121 to the other input of NAND gate 118, while the output of amplifier 36 is applied through a conductor 122 connected to conductor 114 at a point 123 to the other input of NAND gate 112. Amplifiers 110 and 116 and gates 112, 118 are included in an ambiguity logic circuit designated generally by the number 124.

The output from gate 112 an ambiguity logic circuit 124 is applied to a driving amplifier 130 which drives a relay 132 for actuating switches 86 and 88. The output from gate 118 in ambiguity logic circuit 124 is applied to a driving amplifier 136 which drives a relay 138 for actuating switches 98 and 100. As heretofore noted, the relays and switches are shown for purposes of illustration, and solid state switches may be used as well.

The output provided by either one of the switches 86 or 88 being closed is applied through a conductor 140 to a summing means 142 where it is summed with the output of preamplifier 78 applied to summing means 142 through a conductor 144. A conductor 146 leads from summing means 142 to the non-inverting input terminal (+) of a servo amplifier 148.

The output provided by either one of the switches 98 or 100 being closed is applied through a conductor 150 to the inverting input terminal (−) of servo amplifier 148.

The output of servo amplifier 148 is connected to an output circuit such as described in the aforenoted U.S. Pat. No. 3,662,246, and which output circuit includes a pair of transistors energized by suitable sources of positive and negative d.c. voltages, respectively. Output circuit 152 drives a torquer 154, and which torquer is connected by suitable mechanical means 156 to arm 32A of potentiometer 32 and to arm 30A of potentiometer 30 for displacing the potentiometer arms.

OPERATION OF THE INVENTION

The arrangement shown in FIG. 1 is such that when potentiometer arm 30A is displaced, the output from the potentiometer arm to ground, due to the constant excitation of the potentiometer, increases linearly from zero volts at 0° displacement to maximum volts $V_o$ at 180° displacement, and decreases linearly from maximum volts at 180° displacement to zero volts at 360° displacement to provide a waveform as shown in FIG. 2. The waveform results in smooth operation of the servo system without abrupt changes causing instrument error as would occur if excitation switching were required as in the prior art.

The arrangement of potentiometers 30 and 32 is such that potentiometer 32 is offset from potentiometer 30 by 90°, i.e., potentiometer 30 is grounded at 0° and energized at 180° while potentiometer 32 is grounded at 0° and energized at 270°. The potentiometers thus function to determine the zone of operation that the servo is in, i,e., with reference to FIG. 1, the zone from 0° to 180° or the zone from 180° to 360°.

Shortest direction selector circuit 54, ambiguity logic circuit 124 and ambiguity switch circuit 106 cooperate to determine when the servo command signal from servo command signal means 2 and the follow-up signal from potentiometer 30 are not in the same zone, and to determine the shortest displacement of the potentiometer arm to bring the signals into the same zone.

Thus, shortest direction selector circuit 4 operates to compare the signal from command signal means 2 and the follow-up signal from potentiometer 30, applied through isolation amplifier 34, to provide a signal commensurate with the selection by the servo loop of the shortest path to its command position when the feedback and command positions are in different zones of the output waveform of FIG. 2.

Ambiguity logic circuit 124 operates to introduce the shortest direction selector voltage into the inverting and non-inverting inputs of servo amplifier 148, as the case may be, as a function of the shortest distance direction as determined by circuit 4. The magnitude of the signal provided by circuit 4 is directly proportional to the difference between signal $E_c$ and the signal provided by potentiometer arm 30A.

Ambiguity switch circuit 106 sums the shortest selector signal from circuit 4 with an error signal provided by preamplifier 78, and applies the summed signal to either the inverting or non-inverting input terminals of servo amplifier 148 only when the command and follow-up positions are in different zones.

The combination of potentiometer 32 and amplifier 36 provides means for determining which waveform zone follow-up potentiometer 30 is in. When the voltage on potentiometer arm 32A exceeds the voltage on the inverting input terminal (−) of amplifier 36, and which voltage is a reference voltage, the output of amplifier 36 changes from a logic "low" to a logic "high". This function, combined with the operation of amplifier 40, is processed through circuit 124 to operate circuit 106.

Torquer direction switch circuit 52 directs the command and position signals to the appropriate inverting and non-inverting input terminals of preamplifier 78 for the appropriate rotation of torquer 154 as determined by digital signal means 38.

Although a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A digital continuous servo system feedback device comprising:
   a first potentiometer having a displaceable arm and a second potentiometer having a displaceable arm and offset from the first potentiometer by a predetermined electrical angle, and providing a follow-up signal in accordance with the displacement of the arms, the follow-up signal having a waveform with a first zone wherein the signal level increases linearly from zero to maximum and a second zone wherein said signal level decreases linearly from maximum to zero;
   means for providing a servo system command signal;
   means for providing a digital servo system output signal;
   circuit means responsive to the follow-up signal, the servo system command signal and the digital servo system output signal for determining when the command and follow-up signals are not in the same waveform zone, and for determining the shortest displacement of the potentiometer arms to bring said signals into the same zone;
   means driven by said circuit means for displacing the potentiometer arms, whereupon the second potentiometer provides the follow-up signal; and
   the first and second potentiometers cooperating to determine the zone of the follow-up signal waveform that the servo system is in.

2. A device as described in claim 1, wherein the circuit means responsive to the follow-up signal, the servo system command signal and the digital servo system output signal for determining when the command and follow-up signals are not in the same waveform zone, and for determining the shortest displacement of the potentiometer arms to bring said signals into the same zone includes:
   a first circuit connected to the command signal means and to the second potentiometer for comparing the command signal and the follow-up signal and for providing a signal commensurate with the selection by the servo system of the shortest path to the command position when the command and follow-up signals are in different waveform zones.

3. A device as described by claim 2, wherein the magnitude of the signal provided by the first circuit is directly proportional to the difference between the command and follow-up signals.

4. A device as described by claim 2, wherein the circuit means further includes:
   a preamplifier having an inverting input terminal and a non-inverting input terminal;
   a second circuit connected to the second potentiometer, the command signal means, the digital servo system output signal means and the preamplifier, and directing the command and follow-up signals to the appropriate inverting and non-inverting input terminals of the preamplifier, whereupon the preamplifier provides an error signal in accordance with the logic level of the digital servo system output signal.

5. A device as described by claim 4, wherein the circuit means further includes:
   a servo amplifier having an inverting input terminal and a non-inverting input terminal;
   a third circuit connected to the first circuit and to the preamplifier for summing the shortest path signal from the first curcuit and the error signal from the preamplifier, and for applying the summed signal to one of the inverting and non-inverting input terminals of the servo amplifier.

6. A device as described by claim 4, wherein the circuit means further includes:
   a fourth circuit connected to the arm of the first potentiometer and to the digital servo system output signal means and responsive to the signals therefrom for providing logic outputs; and the third circuit connected to the fourth circuit and responsive to the logic outputs therefrom for applying the summed signal to one of the inverting and non-inverting input terminals of the servo amplifier.

7. A device as described by claim 6, including: amplifier means having a non-inverting input terminal connected to the arm of the first potentiometer and an inverting input terminal connected to a reference signal source;

the output of the amplifier means changing from a logic "low" to a logic "high" when the signal on the first potentiometer arm exceeds the reference signal;

other amplifier means having a non-inverting input terminal connected to the digital servo system output signal means and an inverting input terminal connected to a voltage source, said other amplifier providing logic "low" and logic "high" signals commensurate with the level of the digital servo system output signal; and the fourth circuit means connected to the one and the other amplifier means for providing the logic outputs in response to the logic signals therefrom.

* * * * *